United States Patent [19]

Hosobuchi

[11] Patent Number: 5,488,285
[45] Date of Patent: Jan. 30, 1996

[54] GAS-CONTROLLED BATTERY CHARGING DEVICE FOR A DRIVERLESS TRANSPORT VEHICLE

[75] Inventor: Eiji Hosobuchi, Ise, Japan

[73] Assignee: Shinko Electric Co., Ltd., Tokyo, Japan

[21] Appl. No.: 114,137

[22] Filed: Aug. 30, 1993

[30] Foreign Application Priority Data

Aug. 31, 1992 [JP] Japan .................................. 4-232397

[51] Int. Cl.$^6$ ............................................. H02J 7/02
[52] U.S. Cl. ............................................. 320/46
[58] Field of Search ........................... 320/3, 4, 15, 30, 320/46, 47

[56] References Cited

U.S. PATENT DOCUMENTS

| | | | |
|---|---|---|---|
| 3,100,862 | 8/1963 | Collier | 320/46 |
| 3,328,663 | 6/1967 | Kagan | 320/46 X |
| 4,465,963 | 8/1984 | Iseard | 320/46 |
| 4,496,896 | 1/1985 | Melocik et al. | 320/2 |
| 4,551,667 | 11/1985 | McAuliffe | 320/46 |
| 4,679,152 | 7/1987 | Perdue . | |
| 5,049,802 | 9/1991 | Mintus et al. | 320/2 |

FOREIGN PATENT DOCUMENTS

| | | |
|---|---|---|
| 3530097 | 2/1987 | Germany . |
| 8404212 | 10/1984 | WIPO . |
| 9113389 | 5/1991 | WIPO . |

OTHER PUBLICATIONS

"Automatic Charger", Takashi, Patent Abstracts of Japan vol. 15, No. 98 (1991).

Primary Examiner—Peter S. Wong
Assistant Examiner—Edward Tso
Attorney, Agent, or Firm—Thompson, Hine & Flory

[57] ABSTRACT

An automatic battery charging apparatus for driverless transport vehicle is presented so as to enable disconnecting the charging source from the batteries when a certain pressure is reached in the interior of at least one battery. A pressure sensor provided inside the battery is set so that the contact of a relay opens when a certain interior pressure which is lower than the activating pressure for a safety valve provided on the battery. This prevents an excessive pressure build up in the battery interior caused, for example, by accidental over-charging, which would release damaging gases and corrosive vapors from the over-charged battery to the outside environment.

4 Claims, 2 Drawing Sheets

GAS-CONTROLLED BATTERY CHARGING DEVICE FOR A DRIVERLESS TRANSPORT VEHICLE

BACKGROUND OF THE INVENTION

1. Field of the Invention

The present invention relates to a battery charging device in general, and relates in particular to a battery charging device for charging a sealed alkaline battery for use with transport vehicles having no driver.

2. Technical Background

In recent years, driverless transport vehicles have become popular for use in clean rooms for producing semiconductor integrated devices. Such driverless transport vehicles are powered by open-type alkaline batteries capable of being fast charged. Recently, an automatic charging apparatus having no driver is used to recharge these alkaline batteries.

FIG. 2 illustrates one such battery charging apparatus. In this figure, the reference numeral 1 refers to a driverless transport vehicle; 2, an alkaline battery provided in the vehicle; 3, a receiving coupling electrically connected to the alkaline battery 2; 4, a controller; 5, an electro-optical data communication device electrically connected to the controller 4 for data communication with outside environment.

The reference numeral 6 refers to a recharging station. In the recharging station 6, 7 refers to a power supply coupler which is constructed so as to be freely movable in the direction indicated by the arrow A, and is electrically connected to the receiving coupler 3 of the driverless transport vehicle 1. The reference numeral 8 refers to an electro-optical data communication device of the recharging station 6 to communicate with the electro-optical data communication device 5 of the driverless transport vehicle 1 (shortened to vehicle 1 hereinbelow). The reference numeral 9 refers to a power source and is electrically connected with the power supply coupler 7 and the optical data communication device With this configuration of the apparatus, when the vehicle 1 arrives at the charging station 6, the power supply coupler 7 moves towards the vehicle 1 guided by the data communication devices 5, 8, and connects with the receiving coupler 3. Following this event, the charging device 9 begins charging the alkaline battery 2. During the charging period, the controller 4 monitors the output voltage of the battery 2 periodically and the data indicating the monitored voltage are transmitted to the charging device 9 via data communication devices 5, 8.

FIG. 3 is an illustration to explain the charging process. The solid line L1 shows the time-dependence of the charging current to the battery 2, and the solid line L2 shows the variations in the voltage at the terminals of the battery 2. As shown in this figure, the charging device 9 performs charging at a constant charging current. Next, after the voltage at the terminals of the battery 2 has reached a specific voltage V1, the charging device 9 performs charging at a constant voltage. When the charging current reaches a certain current A2 (or after a fixed interval of time), the charging operation is ended.

In the clean room environment, in order to improve manufacturing efficiency, alkaline batteries are used, since such batteries can be rapidly charged.

Occasionally, however, over-charging of the battery occurs when the normal voltage for full charge cannot be obtained for some reason or when the charging device malfunctions. Unfortunately, gasses from the alkaline battery can negatively influence the environment of the clean room. Thus, a sealed alkaline battery has been used in place of the open-type alkaline battery. The open-type alkaline batteries are provided with a pressure release safety valve for venting the excess battery interior gases (hydrogen and oxygen) caused by over-charging. The sealed alkaline battery has a safety valve, and when the interior pressure in the battery cell reaches a certain value, the safety valve is opened, thereby spreading gasses in the clean room. In clean room operations, such release of gases and alkaline vapors will have a damaging effect on the products (integrated circuits and others), and adversely affect the yield. Therefore, it is necessary that such over-charging events be strictly controlled.

SUMMARY OF THE INVENTION

The present invention was made in consideration of the background presented above, and an object of the invention is to present a battery charging apparatus which, should over-charging occur, prevents an increase in the interior pressure of the battery without activating the safety release valve, thus preventing the battery interior gases to be released to the exterior environment.

The object is achieved by a charging apparatus for automatically charging a plurality of sealed alkaline batteries providing a motive power for a driverless transport vehicle, the apparatus comprising: a pressure sensor, disposed in the interior of at least one alkaline battery of the plurality of sealed alkaline batteries, for monitoring the pressure in the interior of the at least one alkaline battery, and generating a signal when the interior pressure in the at least one battery exceeds a shut-off pressure which is lower than a predetermined pressure for preventing an excess pressure build-up in the interior of the battery; and a device electrically connected to the pressure sensor for stopping charging of the battery upon receiving the signal from the pressure sensor.

According to the battery charging apparatus, the pressure in the interior of the battery is monitored by the pressure sensor, and a signal is generated when the interior pressure exceeds a shut-off pressure which is lower than the predetermined pressure for the safety valve operation. The stopping device disconnects the power source from the battery when the signal is received from the pressure sensor. Therefore, the charging operation is stopped automatically before the interior pressure reaches a predetermined allowable value. Therefore, it enables to prevent an excessive pressure build-up in the interior of the battery, without activating a safety release valve.

PREFERRED EMBODIMENT

A preferred embodiment will be explained in the following with reference to the figures.

Figure 1:
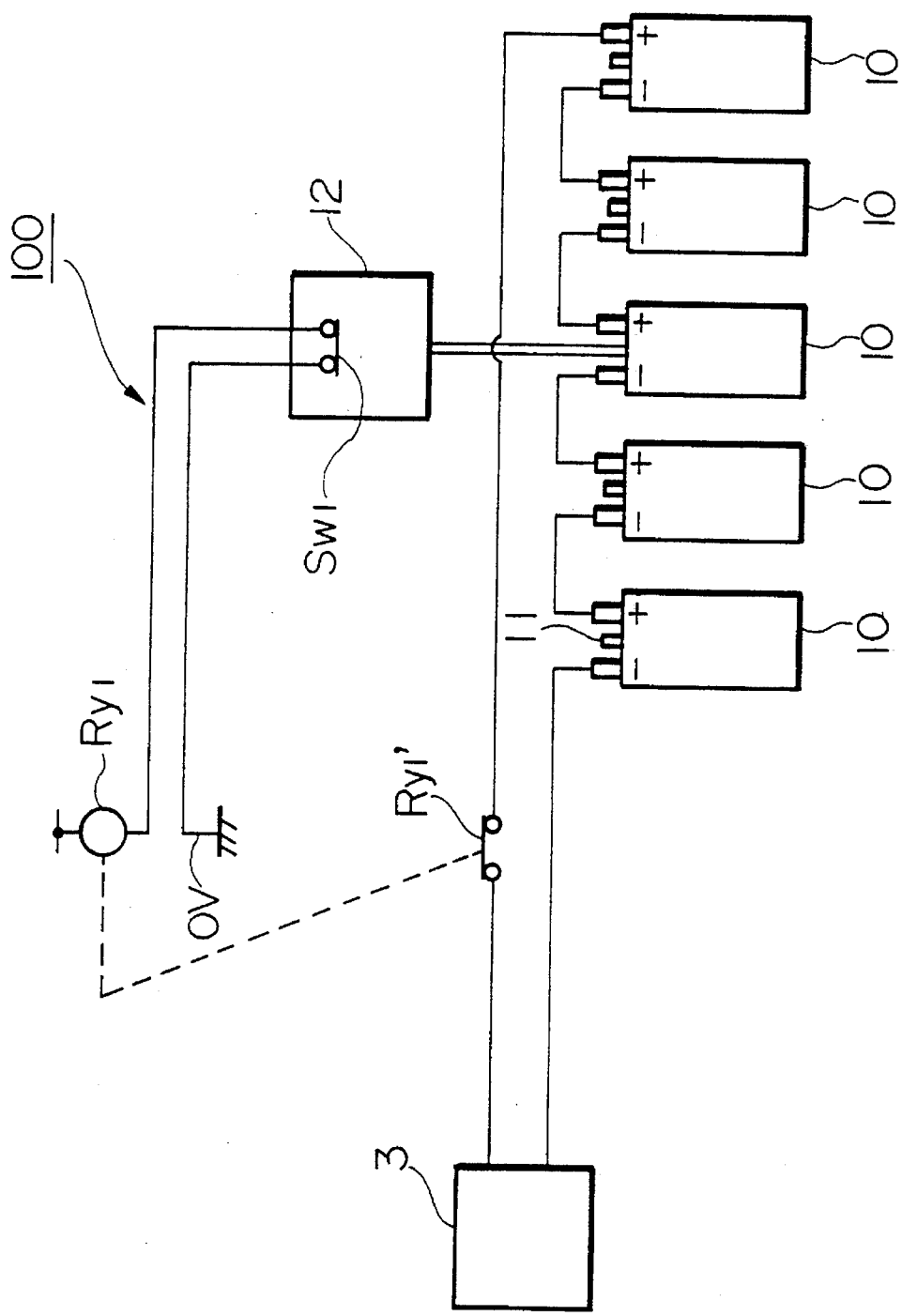
FIG. 1 is an embodiment of a charging apparatus for charging a battery for a driverless transport vehicle.
Figure 2:
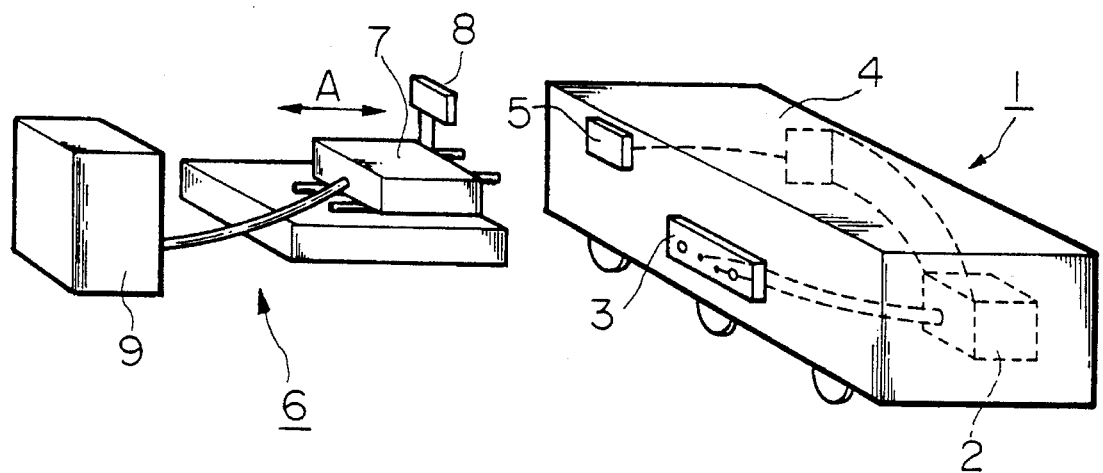
FIG. 2 is a block diagram for the conventional type of battery charging apparatus for charging a battery for a driverless transport vehicle.
Figure 3:
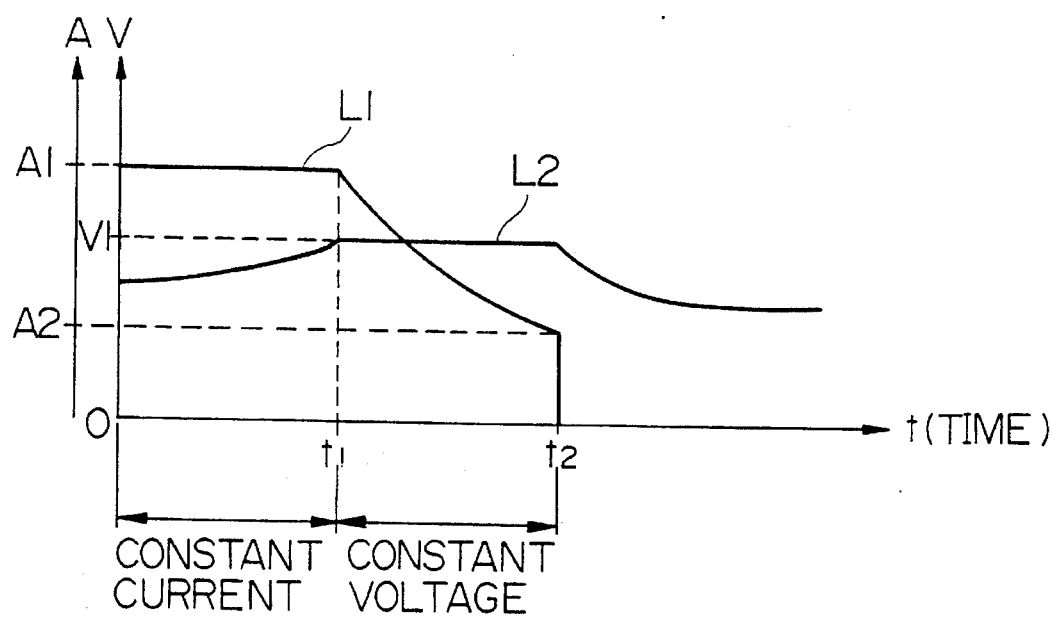
FIG. 3 illustrates time-dependent variations in the charging current and voltage.

FIG. 1 is a block diagram to show the application of a circuit device 100 to prevent over-charging of an alkaline battery for a driverless transport vehicle. In this figure, the reference numeral 10 refers to a sealed alkaline battery, and is electrically connected to the receiving coupler 3. In this embodiment, there are five alkaline batteries 10 which are electrically connected in a series arrangement. The pressure release safety valve 11 provided on each battery 10 is a safety device to prevent an explosion and other damage to the battery 10 caused by an accumulation of the gases resulting from over-charging, and when this valve 11 is opened, the accumulated interior gases and alkaline vapors are vented out. A pressure sensor 12 is provided to determine the interior pressure of the battery 10. The pressure sensor 12 acts as an alternative to the safety release valve 11, and could possibly replace the safety valve 11 usually provided for the battery 10. In this embodiment, one pressure sensor 12 is provided for one battery 10, but it is permissible to provide one sensor for any one specific battery 10 or for a number of batteries 10.

The switch Sw1 provided inside the pressure sensor 12 is ON by being normally-closed; when the interior pressure of the battery exceeds a specific pressure A, the switch Sw1 becomes OFF by being opened. One end terminal of the switch Sw1 is electrically connected to a coil of the relay Ry1, and the other terminal end is grounded as shown at 0V. The relay Ry1 is electromagnetically-connected with a relay contact Ry1' disposed between the battery 10 and the receiving coupler 3. During the normal operation of the charging apparatus, i.e. when the interior pressure is below the specific pressure A, the relay contact Ry1' is closed by the energized magnetic field generated by the coil of the relay Ry1.

With this construction of the battery charging apparatus, if B is the predetermined pressure at which the safety valve 11 of the battery 10 will operate (open), the relationship between the specific pressure A and the predetermined pressure B is:

$$A < B \qquad \text{Equation 1}$$

Also, it is known that there is a time lag between the detection of the specific pressure A by the pressure sensor 12 and the cessation of the electrochemical reactions inside the battery 10. Therefore, even after the charging operation is stopped, the pressure in the interior of the battery 10 continues to increase for sometime creating an excess pressure a over the specific pressure A, thus making the total interior pressure to be $A+\alpha$.

In other words, if charging is controlled at the value of A to satisfy the above equation 1, there is a danger that the interior pressure of the battery 10 will build up to a value of $A+\alpha$, which may exceed the predetermined pressure B. If $A+\alpha > B$, the gases and alkaline vapors will be vented from the safety valve 11.

It is therefore necessary that the pressure sensor 12 be controlled at the shut-off pressure A' so as to maintain the following relationship:

$$A' < B - \alpha \qquad \text{Equation 2}$$

The charging of the battery 10 is performed with the pressures settings as defined above. If over-charging occurs, there is an increase in the interior pressure of the battery 10, and when the interior pressure exceeds the shut-off pressure A', the switch Sw1 of the pressure sensor 12 opens (OFF). The coil of the relay Ry1 is deenergized, and the relay contact Ry1' of the relay Ry1 opens (OFF), and the flow of the charging current to the battery 10 is shut off. After the current is shut off, even if the interior pressure of the battery 10 increases to the value of α, the above relationship expressed by Equation 2 is maintained and the safety valve 11 does not open.

As explained above, charging of the battery 10 is stopped (charge stopping means) when the interior pressure of the battery 10 reaches the shut-off pressure A'. This shut-off pressure A' is chosen so that, after the completion of the electrochemical reactions subsequent to stopping of the charging of the battery 10, the interior pressure of the battery 10 is still below the predetermined pressure B at which the valve 11 becomes activated. Therefore, the valve 11 is prevented from operating.

In the above embodiment, the specific pressure A is detected, and the relay contact Ry1' of the relay Ry1 is opened so as to disconnect the battery 10 in the vehicle 1 from the receiving coupler 3. It is also possible to arrange the charging apparatus such that the charging apparatus is operated through data communication device, which can include electro-optical devices for converting electrical data to optical signals, and vice versa. The charging station includes a power source, a controller, a communication device and a switch Sw1 for turning off the power to the battery. The driverless transport vehicle is provided with a battery to be charged, a communication device for communicating with the data communication device disposed in the charging station, and a pressure sensor. The pressure sensor generates a shut-off signal when a predetermined pressure A' is exceeded in the battery. The shut-off signal is transmitted from the driverless transport vehicle to the charging station through the electro-optical communication devices, 5, 8 as a stopping signal. When receiving the stopping signal, the controller disconnects the power source from the battery by opening the switch Sw1.

What is claimed is:

1. A charging apparatus for automatically charging, in a clean-room environment, an alkaline battery providing a motive power for a driverless transport vehicle, said apparatus comprising: a pressure sensor, associated with an interior of said alkaline battery, for monitoring pressure in the interior of said alkaline battery, and generating a signal when the interior pressure in said alkaline battery exceeds a shut-off pressure A' which is lower than a predetermined pressure B; and charge stopping means for stopping charging of said alkaline battery upon receiving said signal from said pressure sensor; said predetermined pressure B being the pressure at which gasses will be released from the interior of said alkaline battery into the clean-room environment; and said shut-off pressure A' being selected such that a pressure difference between said shut-off pressure A' and said predetermined pressure B is greater than a pressure increase α in said alkaline battery after said charge stopping means stops the charging of said alkaline battery, thus maintaining a relationship of $A' < B - \alpha$.

2. A charging apparatus as claimed in claim 1, wherein said charging stopping means comprise: a switch disposed between a charging source and the alkaline battery and a circuit means for disconnecting said switch upon receiving said signal from said pressure sensor.

3. A charging apparatus as claimed in claim 1, wherein said apparatus is capable of charging a plurality of sealed alkaline batteries simultaneously, and said sensor monitors an interior pressure of at least one of said plurality of sealed alkaline batteries.

4. A charging apparatus for automatically charging a sealed alkaline battery providing a motive power for a driverless transport vehicle, said apparatus comprising:

a charging station device having a power source for charging said sealed alkaline battery, a controller for controlling charging of said battery, data communication means, including electro-optical devices, for communicating data with said driverless transport vehicle, and switching means for disconnecting said power source from said sealed alkaline battery when receiving a stopping signal through said data communication means; and communication means, including electro-optical devices, disposed in said driverless transport vehicle device for communicating data with said data communication means disposed in said charging station device, wherein said communications means monitor an interior pressure of said sealed alkaline battery through a pressure sensor, generate said stopping signal and transmit said stopping signal to said switching means for disconnecting said power source from said sealed alkaline battery disposed in said charging station to prevent excessive pressure build up in the battery interior, thereby preventing release of damaging gases and corrosive vapors from an over-charged battery to an outside environment.

* * * * *

UNITED STATES PATENT AND TRADEMARK OFFICE
CERTIFICATE OF CORRECTION

PATENT NO. : 5,488,285

DATED : January 30, 1996

INVENTOR(S) : Eiji Hosobuchi

It is certified that error appears in the above-indentified patent and that said Letters Patent is hereby corrected as shown below:

Claim 1, col. 4, line 55, insert a --;-- after "battery" and before "and".

Signed and Sealed this

Fourth Day of June, 1996

Attest:

BRUCE LEHMAN

Attesting Officer     Commissioner of Patents and Trademarks